Nov. 8, 1927.

S. I. FEKETE 1,648,299

LUBRICATING SYSTEM FOR BEARINGS

Filed June 29, 1922

INVENTOR=
Stephen I. Fekete
by Macleod, Cahn, Copeland & Pike
Attys

Patented Nov. 8, 1927.

1,648,299

UNITED STATES PATENT OFFICE.

STEPHEN I. FEKETE, OF DETROIT, MICHIGAN, ASSIGNOR TO ESSEX MOTORS, OF DETROIT, MICHIGAN, A CORPORATION OF MICHIGAN.

LUBRICATING SYSTEM FOR BEARINGS.

Application filed June 29, 1922. Serial No. 571,603.

My present invention has for its object an oil lubricating system for plain bearings. The particular object of the invention is to provide a smooth or plain bearing of such a construction that it will contain lubricating oil, and the said oil will be caused to circulate continuously, thereby being distributed uniformly to all parts of the bearing. The bearing embodying my invention has no additional parts, the oil being caused to circulate by reason of the construction of the two members which revolve relatively to each other.

Bearings embodying my invention can be manufactured without additional expense and, as long as they are supplied with oil, are continuous in operation.

The bearing embodying my invention has the great advantage that there are no local dry or unlubricated regions where cutting occurs. The friction is considerably reduced and the bearing runs are cooler.

In the accompanying drawings, I have illustrated my invention as embodied in a bearing for a fan pulley of an automobile, this being a bearing with which difficulty in proper lubrication has frequently been experienced. It will be understood, however, that my invention is applicable to bearings for many other purposes and, in fact, almost any in which there is a fixed spindle and rotating shell or a rotating spindle and a fixed shell.

The invention will be fully understood from the following description when taken in connection with the accompanying drawings, and the novel features thereof will be pointed out and clearly defined in the claims at the close of this specification.

In the drawings, Fig. 1 is a side elevation of a fan shaft with a bearing and pulley embodying my invention.

Figure 1:
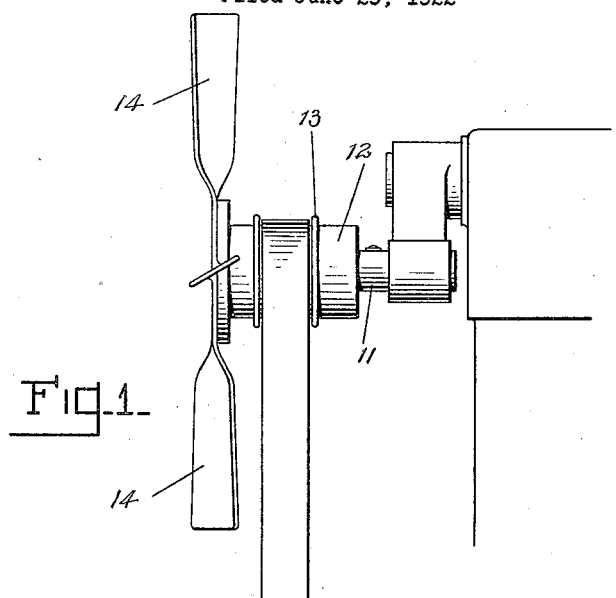
Figure 2:
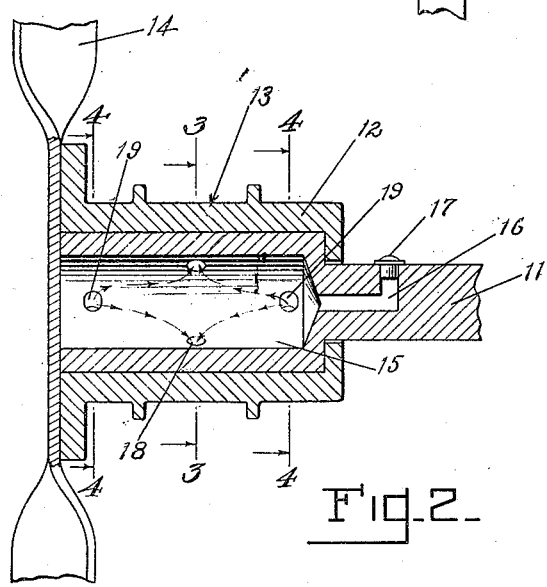
Fig. 2 is a vertical section of the bearing shown in Figure 1.

Referring now to the drawings, a shaft or fixed spindle is designated 11. A shell revolves thereon and is designated 12. In the drawings, I have shown the shell as having a belt pulley 13 formed on its exterior. A fan 14 is secured to the shell. In the form of bearing shown in the drawings, the shell rotates relatively to the fixed spindle 11 and thereby drives the fan 14. The spindle contains a reservoir or chamber 15 to receive oil which is supplied to it through an oil duct 16 closed by a cap 17. This cap is located beyond the end of the shell 12.

The member of the bearing which contains the oil chamber which, in the form shown in the drawings is the fixed spindle, is pierced with two sets of oil holes which are at an angle to each other and are somewhat tangential to the cylindrical surface of the bearing to induce flow in opposite directions. In other words, said holes are oppositely inclined to the radii to the axis of relative rotation of the members in planes perpendicular to said axis, or are oppositely sloped with respect to the direction of said relative rotation. Of these holes, the outflow holes are shown at 18 (see Figure 3), while inflow holes are shown at 19 (see Figure 4). In practice, I place the outflow holes at the centre of the bearing and two groups of inflow holes at the opposite ends of the bearing so that there is flow in two directions.

Figure 3:
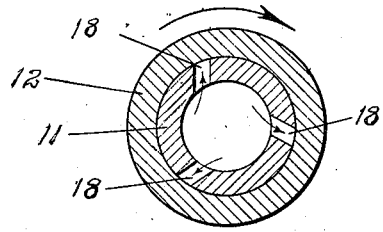
Fig. 3 is a section on line 3, 3, of Figure 2, looking in the direction of the arrows.
Figure 4:
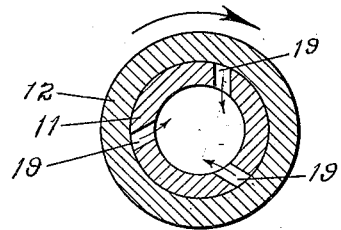
Fig. 4 is a section on line 4, 4 of Figure 2, looking in the direction of the arrows.

If the shell 13 rotates relative to the spindle 11 in the direction of the arrow, as shown in Figure 3, its interior bearing surface tends to wipe the oil out of the outflow holes 18, carrying it into the space between the bearing surfaces of the spindle and the shell. Oil in the chamber 15 then flows in to take its place. The oil in the space between the members of the bearing being carried forward by the shell, tends to be removed from this space by a scraping action through the inflow holes 19 (Fig. 4) and thus to return to the chamber, thus setting up a complete circulation.

It will be understood that if the direction of the shell is changed, the lubrication system will operate in the same way except that the direction of flow will be reversed, the outflow holes becoming the inflow holes, and vice versa.

While I have shown in the drawings a bearing in which a fixed spindle contains the oil reservoir, I do not limit myself to this construction, since it is obvious that either member may rotate, and that it is not essential that the oil chamber be in a fixed member, the essential feature being the provision of outflow and inflow holes leading from the reservoir to the bearing surface, said holes being sloped to induce a flow of oil in opposite directions.

What I claim is:

1. In a bearing, the combination of two relatively rotatable coaxial members, one of said members being provided with a lubricant reservoir or chamber, the wall of said last named member being pierced with holes communicating with said reservoir and with the bearing surface between said members, said holes being oppositely inclined respectively to radii to the axis of said members to induce a flow of lubricant to and from said reservoir.

2. In a bearing, the combination of two relatively rotatable coaxial members, one of said members being provided with a lubricant reservoir or chamber, the wall of said last named member being pierced with holes communicating with said reservoir and with the bearing surface between said members, said holes being oppositely inclined respectively to radii to the axis of said members in planes perpendicular to said axis to induce a flow of lubricant to and from said reservoir.

3. In a bearing, the combination of two relatively rotatable coaxial members, one of said members being provided with a lubricant reservoir or chamber, the wall of said last named member being pierced with holes communicating with said reservoir and with the bearing surface between said members, said holes being oppositely inclined respectively to radii to the axis of said members, and spaced longitudinally of said axis to induce a flow of lubricant to and from said reservoir and longitudinally over said surface.

In testimony whereof I affix my signature.

STEPHEN I. FEKETE.